(12) United States Patent
Teng et al.

(10) Patent No.: US 6,914,864 B1
(45) Date of Patent: Jul. 5, 2005

(54) METHOD AND SYSTEM FOR DETECTING CRACKS IN OPTICAL DISCS

(75) Inventors: Too Yew Teng, Singapore (SG); Shigeki Okazaki, Saitama (JP); Choo Poo Dee, Singapore (SG)

(73) Assignee: Creative Technology Ltd., Singapore (SG)

( * ) Notice: Subject to any disclaimer, the term of this patent is extended or adjusted under 35 U.S.C. 154(b) by 0 days.

(21) Appl. No.: 09/560,122

(22) Filed: Apr. 28, 2000

(30) Foreign Application Priority Data

Apr. 3, 2000 (SG) .......................................... 20000189

(51) Int. Cl.⁷ ................................................ G11B 7/00
(52) U.S. Cl. ................................ 369/53.15; 369/47.44
(58) Field of Search ........................... 369/44.32, 44.33, 369/44.41, 44.42, 47.14, 47.5, 53.15, 53.17, 53.22, 53.23, 53.42, 53.43, 53.2, 116, 59.22, 53.31, 47.42, 47.44, 47.45

(56) References Cited

U.S. PATENT DOCUMENTS

| 5,434,838 A | * | 7/1995 | Haneda ................... 369/53.15 |
| 6,181,662 B1 | * | 1/2001 | Krieger et al. ................. 369/70 |

FOREIGN PATENT DOCUMENTS

| JP | 09033447 A | * | 2/1997 | .......... G01N/21/88 |
| JP | 09281054 A | * | 10/1997 | .......... G01N/21/88 |
| JP | 11023486 A | * | 1/1999 | .......... G01N/21/88 |
| JP | 11316946 A | * | 11/1999 | ............ G11B/5/84 |

OTHER PUBLICATIONS

Derwent Abstract Accession No. 2000–059315/05, JP 11316946–A (Sony Corp) Nov. 16, 1999; (10 p.).

Derwent Abstract Accession No. 97–325200/30, JP 09128767–A (Matsushita Denki Sangyo KK) May 16, 1997.

Derwent Abstract Accession No. 97–303608/28, JP 09115139–A (Hitachi Ltd) May 2, 1997 (2 p. ).

Derwent Abstract Accession No. 96–243766/25, JP 08096361–A (NEC Corp) Apr. 12, 1996 (2 p.).

Australian Patent Office Search Report for Appln. No. SG 200001889–5 dated Oct. 14, 2002 (4 p.).

* cited by examiner

*Primary Examiner*—Thang V. Tran
*Assistant Examiner*—Bach Vuong
(74) *Attorney, Agent, or Firm*—Russell N. Swerdon; P. Francois de Villiers

(57) ABSTRACT

A device for detecting a crack in an optical disc including a transmitter to propagate an optical signal through the optical disc and a receiver to detect the propagated signal. From the pattern generated from the received signal, a microcontroller makes an analysis to determine if a crack is present on the optical disc. The method may be incorporated into a conventional disc drive as a new crack detection mechanism.

43 Claims, 13 Drawing Sheets

METHOD AND SYSTEM FOR DETECTING CRACKS IN OPTICAL DISCS

FIELD OF THE INVENTION

The present invention relates to optical disc and disc drives. In particular, the present invention relates to the method and device for monitoring and detecting small damages on optical discs.

BACKGROUND

Optical discs are typically made of polycarbonate at a thickness of around 1.2 mm. In a disc drive, the disc is placed onto a turntable by the disc loader mechanism, and clamped onto a clamper for spinning. Due to normal wear and tear, or user mishandling when removing/returning the disc from/to the case, hairline cracks may be created. There cracks are typically created at the inner edge of the optical disc (edge defining the center hole) and extend radially outwards towards the outer edge. These cracks have a tendency to propagate into the data area of the disc, particularly during the high speed spinning used in the disc drive for reading. Once these cracks grow or "cross over" into the region used for the table of content, the optical disc cannot be read by the disc drive any more.

SUMMARY OF THE INVENTION

For the foregoing reasons, there is a need to detect cracks and to reduce the damages to the optical discs. The detection principle is based on the fact that cracks in a transparent material, such as polycarbonate, act as a mirror, reflecting optical signals that are directed at them. Accordingly, the present invention provides, in one aspect, a device for detecting a crack in an optical disc. The device uses a transmitter to propagate an optical signal through the optical disc. At least one receiver is then used to detect the propagated signal that emerge from the disc. From the pattern generated by the received signal, a microcontroller makes an analysis to determine if a crack is present on the optical disc. In one embodiment, the receiver is positioned to detect the unreflected propagated light. In another embodiment, the receiver is positioned to detect reflected propagated light.

In another aspect, the crack detection device is incorporated into a conventional disc drive as a new crack detection mechanism for optical discs. The crack detection mechanism may be installed into the disc drive with the traverse and loader mechanisms. The transmitter propagates a light signal through the disc, and in and at least one receiver is used to detect the propagated signal. The pattern generated from the received signal, is analysed by the microcontroller to determine if a crack is present on the optical disc.

In a further aspect, a method for detecting a crack in an optical disc and for preventing further deterioration is provided. The method starts with the loading of the optical disc into a disc drive, followed by spinning, and reading of the Table of Content. An optical signal is propagated through the optical disc along a path that crosses the region where crack detection is desired. The propagated signal is then received and analysed to determine if a crack is present. From the results of the analysis, an appropriate command is given to the disc drive. In the preferred embodiment, the command to the disc drive will operate at normal speed if no crack is detected. If one or more cracks are detected, then an alert will be sent to the user, and the disc drive can maintain the low speed or halt the spinning altogether.

DESCRIPTION OF THE INVENTION

Figure 1A:
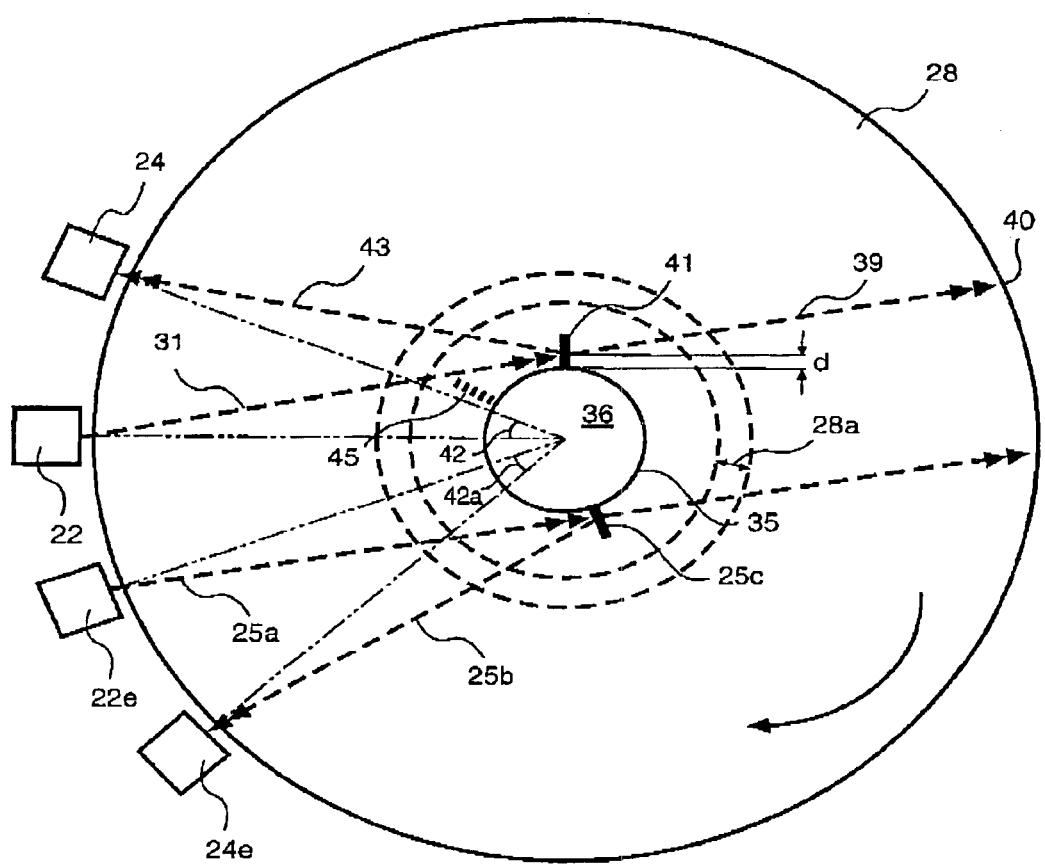
FIGS. 1A and 1B are schematic drawings to show the top and side views of a CD drive according to the present invention.
Figure 1B:
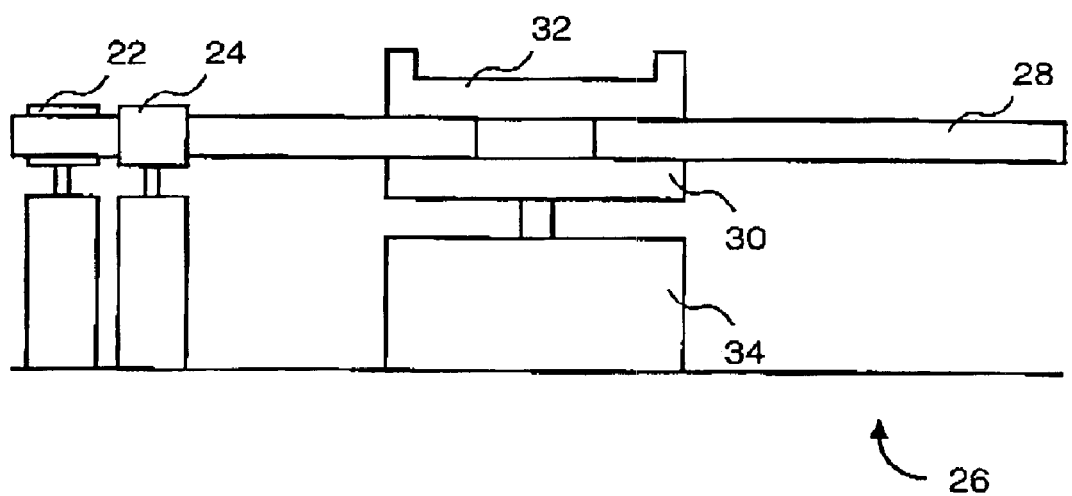

Referring first to FIGS. 1A and 1B, one embodiment of the present invention shows a transmitter 22 and a receiver 24 mounted on the periphery of a disc drive 26. The disc drive 28 contains an optical disc 28 that is loaded into the chassis (not shown) and clamped onto a turntable 30 by a clamper 32. Turntable 30 is coupled to spindle motor 34. The disc contains an outer edge and an inner edge 35 that defines the center hole 36. The Table of Content of the disc is typically found in a concentric area 28a proximate the inner edge. For optical discs currently available, the Table of content is typically 15.5 mm from the inner edge. In this embodiment, the transmitter 22 is position such that the light signal (shown by the dotted arrows) is propagated from a point on the outer edge of the disc and along the plane of the disc. In this embodiment, the direction of the propagated light signal 31 is approximately tangential to the inner edge 35 of the disc, and the light path comes within a short distance of the inner edge of the disc. The shortest distance d between the light path and the edge of the disc depends on the minimum size of the crack that is to be detected. For example, detecting a crack with a minimum length of 2 mm from the inner edge 35, the closest distance d between light path and inner edge is 2 mm. It is clear that distance d can be adjusted and determined according to design requirements. Ideally, distance d should be shorter than the distance from the Table of Content, such that a crack may be detected before the Table of Content is affected. The receiver 24 is positioned at a short distance on one side of the transmitter. In this embodiment, the position of the receiver may be at any convenient location that is not directly in the path of an unreflected propagated signal. For ease of explanation, the relative position between the transmitter and the receiver is expressed as an angle (see ref. numeral 42 in FIG. 1A) they make with the center of the disc. In this embodiment in which the receiver is designed to receive reflected propagated light, the angle is preferably less than 90 degrees.

Figure 1C:
FIGS. 1C–1E show the signals received by the receiver in FIG. 1A over 2 revolutions of the rotating optical disc in the absence (FIG. 1C) or presence of one (FIG. 1D) or two (FIG. 1E) cracks.
Figure 1D:
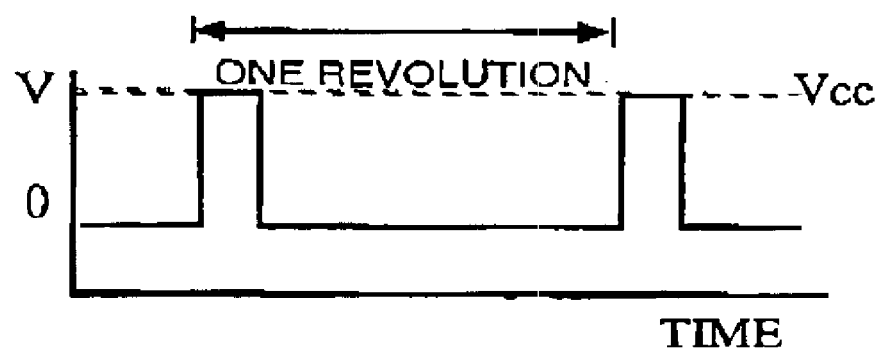
Figure 1E:
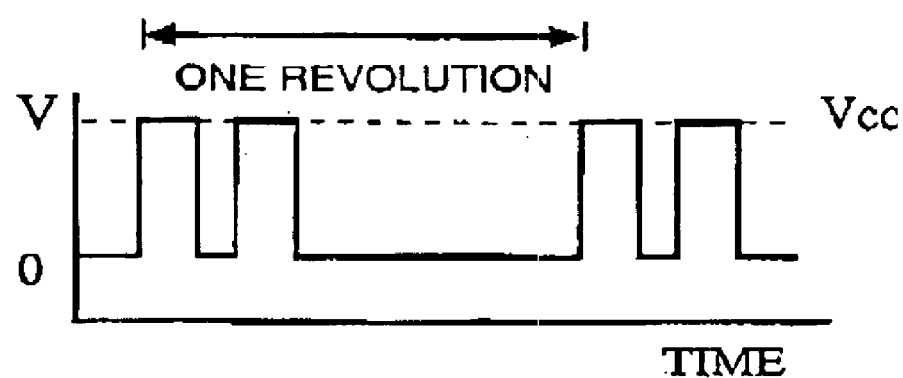

FIGS. 1C–1E show how radiating cracks can be detected based on the signals received by the receiver. Referring first to FIG. 1C, no propagating signal will be received by the receiver in the absence of cracks because the propagated light (see 39 of FIG. 1A) will exit the disc at a point 40 approximately opposite the point of entry into the disc, and a constant, low base signal will be detected. For ease of explanation, propagated light that is not interrupted or reflected by a crack is referred to as unreflected propagated light. In the presence of a crack at the prescribed distance (i.e. distant d) from the inner edge, the propagated signal 31 will be reflected onto the receiver every time the rotating crack falls into the prescribed position 41 in FIG. 1A. The path of the reflected signal is shown by arrow 43 in FIG. 1A. When there is only one crack, one voltage peak (at Vcc) is detected in each revolution, as shown in FIG. 1D. When two crack lines are present (indicated as ref. numerals 41 and 45), two peaks will be detected in each revolution as shown in FIG. 1E. Each peak represents the periods during the rotation of the disc in which a crack at the prescribed distance from the inner edge of the disc falls into the prescribed position. The duration of the peak is dependent on the length of the crack.

Referring back to FIG. 1A, a second set of transmitter 22e and receiver 24e is used to show the flexibility of the present invention. In this example, the signal 25a is generated by transmitter 22e. The position of receiver 24e relative to the transmitter can be expressed as angle 42a. If a crack is present on the disc, signal 25a will be reflected along path 25b every time the crack is rotated to position 25c. Receiver 24e will thus pick up the reflected propagated signal and show a signal pattern similar to the ones shown in FIGS. 1C to 1E, except that the spikes will appear at a different position along the time axis.

Figure 2A:
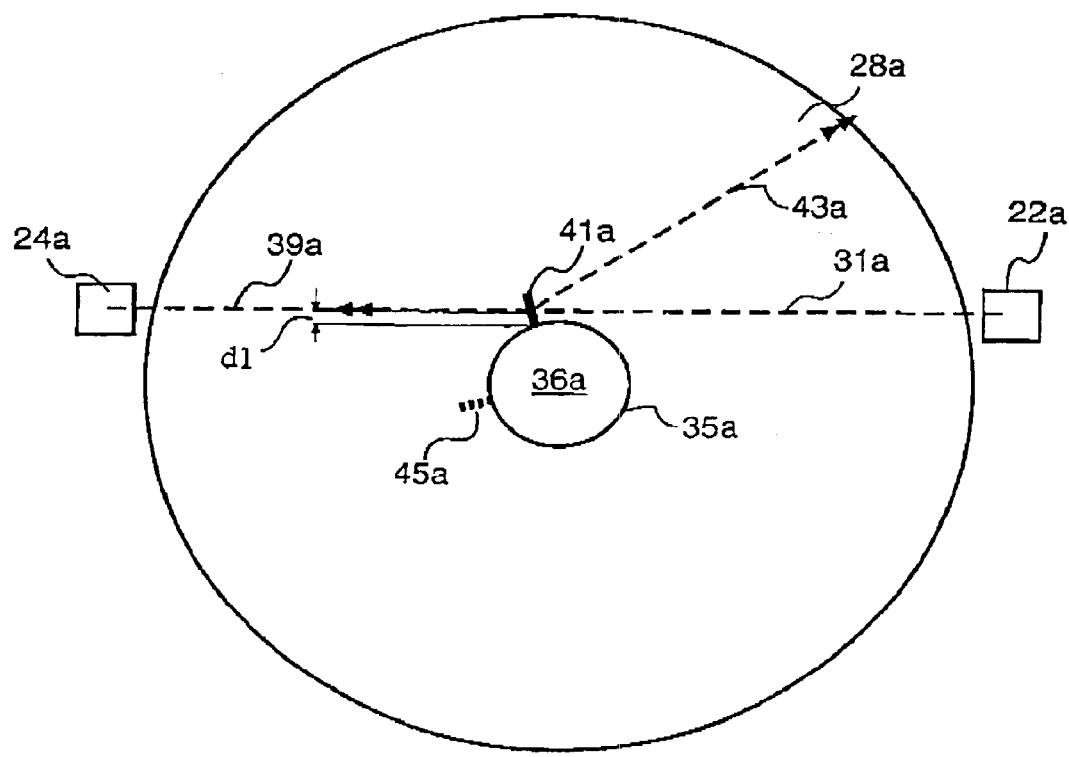
FIGS. 2A and 2B are schematic drawings to show the top and side views of a CD drive according to the present invention.
Figure 2B:
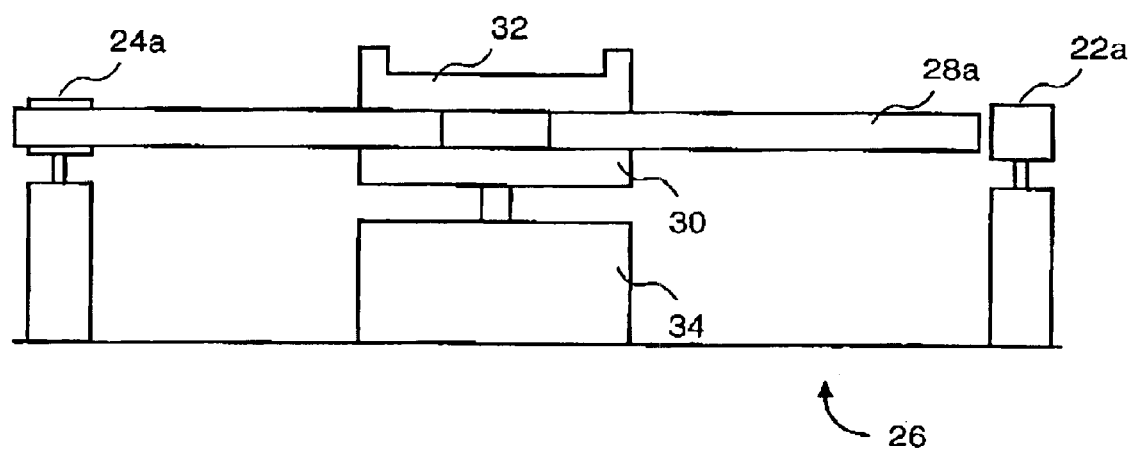

FIGS. 2A and 2B show an alternative embodiment of the present invention in which the receiver 24a is positioned opposite the transmitter 22a. In this embodiment, the transmitter propagates a signal 31a within the disc 28a and along the plane of the disc similar to path 31 of FIG. 1A. The position of the receiver 24a allows it to receive the signal 39a when no crack is present in the disc. The difference in refractive index between air and the transparent material (polycarbonate in the present example), is taken into account when determining the exact position and direction of the receiver. (The change in angle caused by the difference in refractive Indices between air and polycarbonate is not shown in these drawings for ease of illustration). The direction of signal 31a is again approximately tangential to the inner edge 35a of the disc defining center hole 36a, and a distance of d1 from the edge 35a. Distance d1 (also referred to as the prescribed distance) defines the position of a detectable crack relative to the inner edge of the disc. For cracks that originate from the inner edge and radiate outwards toward the outer edge, distance d1 also defines the shortest crack that can be detected by this detector. The same principle applies to the prescribed distance d in the embodiment shown in FIGS. 1A–1C.

The prescribed positions (such as 41, 25c and 41a) discussed above are only used as examples to illustrate how uniform cracks that are radiating directly from the center of the disc are utilised as mirrors to practice the present invention. It is clear that the same receivers can detect non-radial and/or non-uniform cracks, but the prescribed position at which the reflected light is captured by the receiver may vary from the ones used for illustration in the drawings.

Figure 2C:
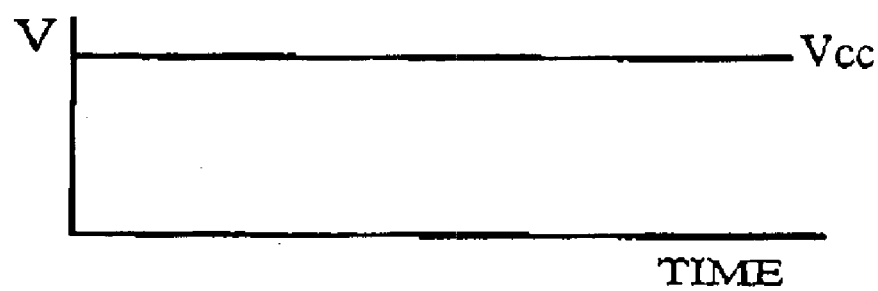
FIGS. 2C–2E show the signals received by the receiver in FIG. 2A over 2 revolutions of the rotating optical disc in the absence (FIG. 2C) or presence of one (FIG. 2D) or two (FIG. 2E) cracks.
Figure 2D:
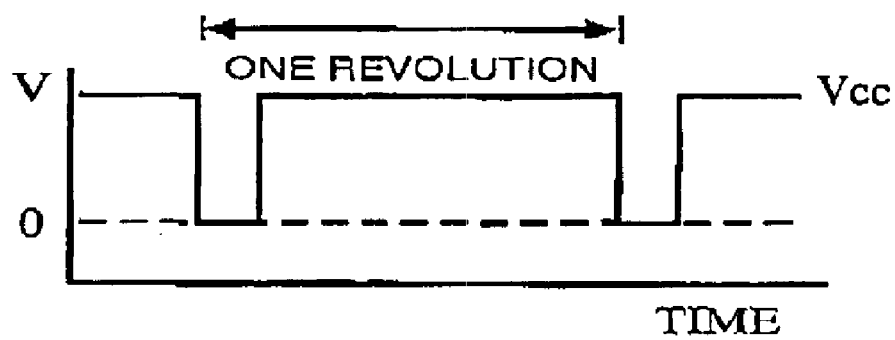
Figure 2E:
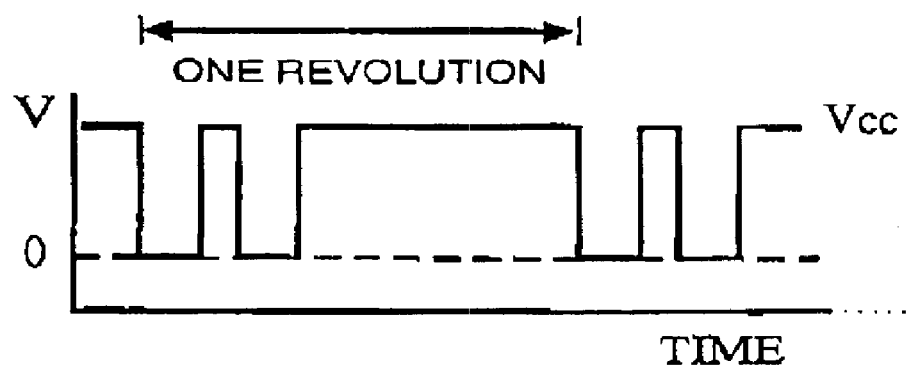

Examples of the signals received by receiver 24a are shown in FIGS 2C–2E. In this embodiment, the receiver will receive a constant "high" signal (Vcc) as the disc spins in the absence of a crack, as shown in FIG. 2C. If one crack is present, a segment of the constant signal is reflected to path 43a when the crack reaches position 41a (see FIGS. 2A and 2B). This results in one sharp dip in the signal per revolution, as shown in FIG. 2D. If two cracks (ref. numerals 41a and 45a) are present, two dips per revolution in the signal results, as shown in FIG. 2E.

Figure 3A:
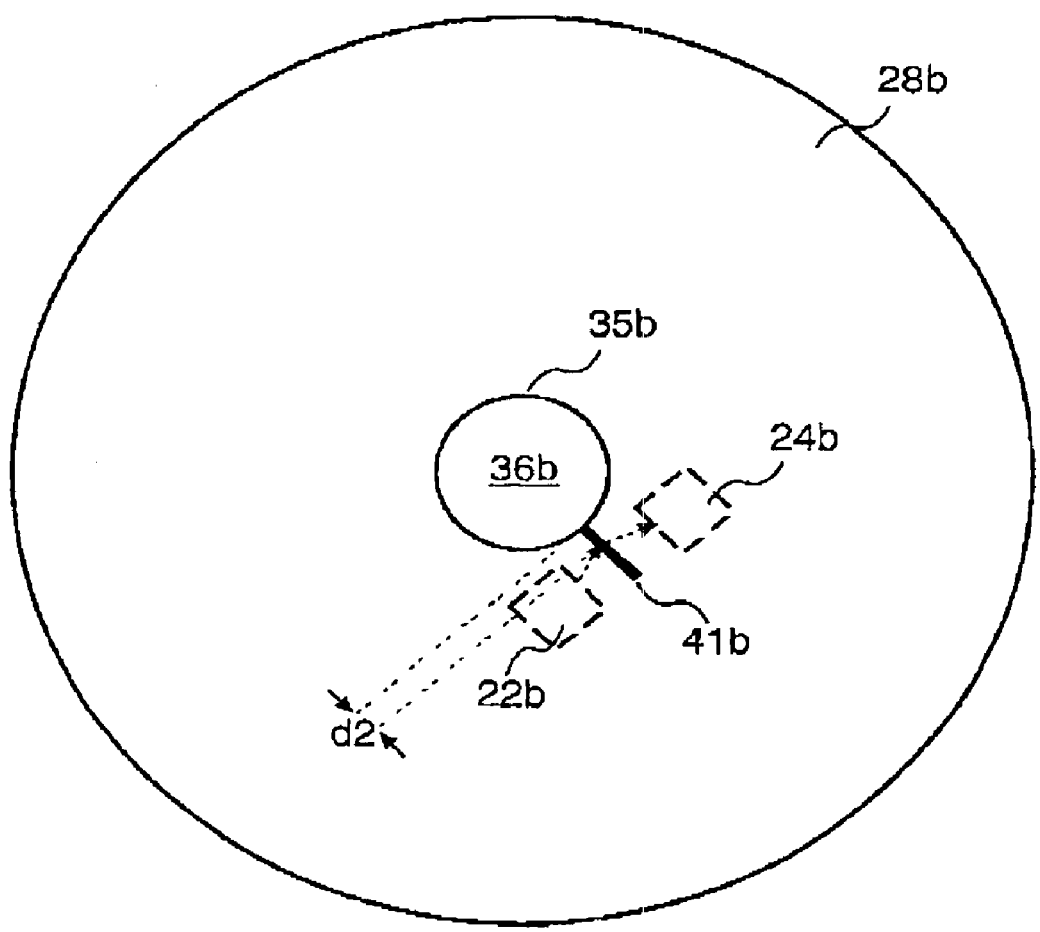
FIGS. 3A and 3B are schematic drawings to show the top and side views of a CD drive according to the present invention.
Figure 3B:
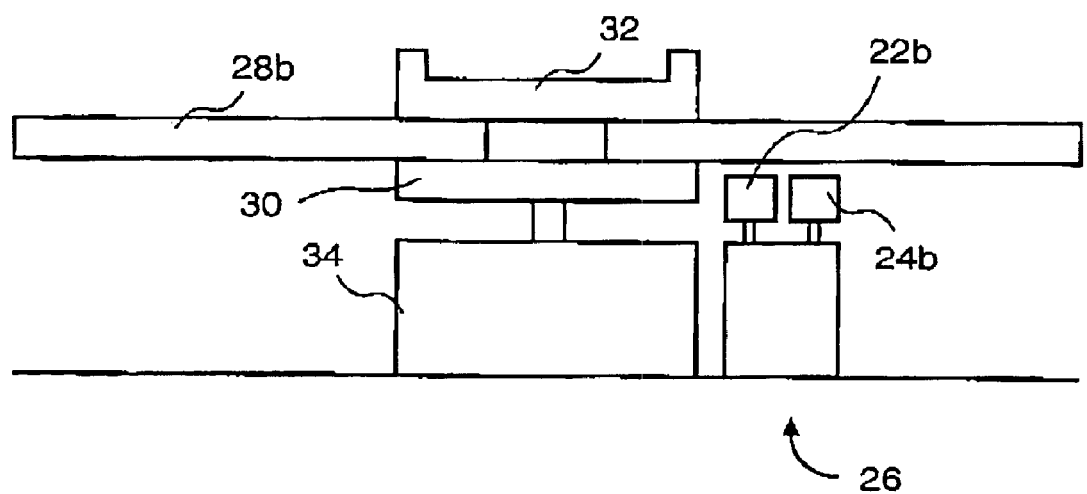
Figure 3C:
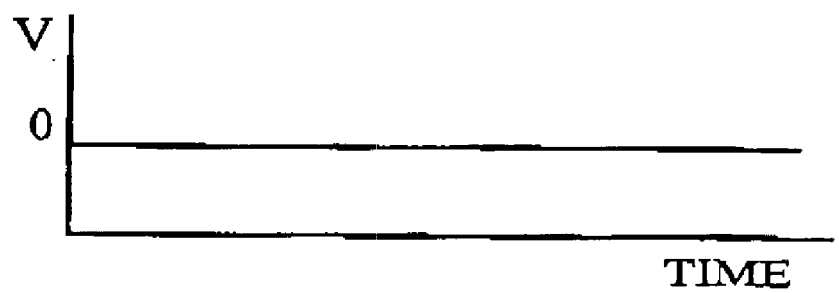
FIGS. 3C–3E show the signals received by the receiver in FIG. 3A over 2 revolutions of the rotating optical disc in the absence (FIG. 3C) or presence of one (FIG. 3D) or two (FIG. 3E) cracks.
Figure 3D:
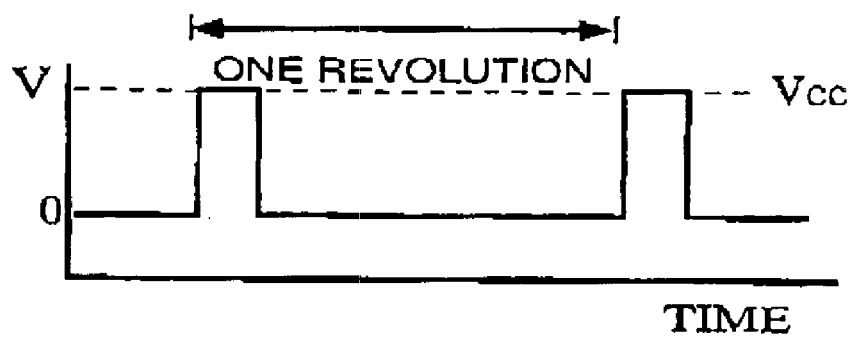
Figure 3E:
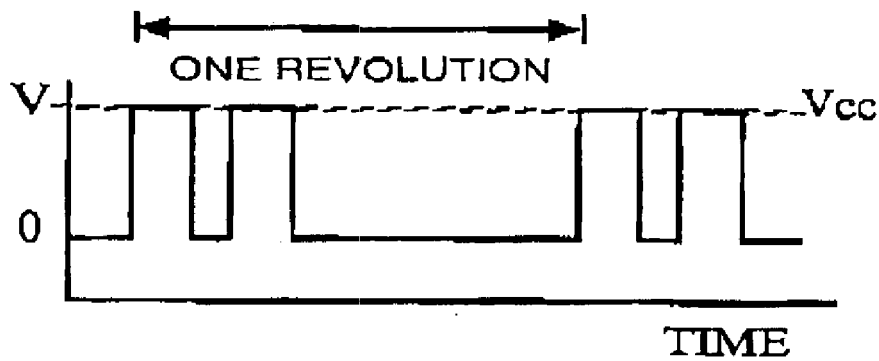
Figure 3F:
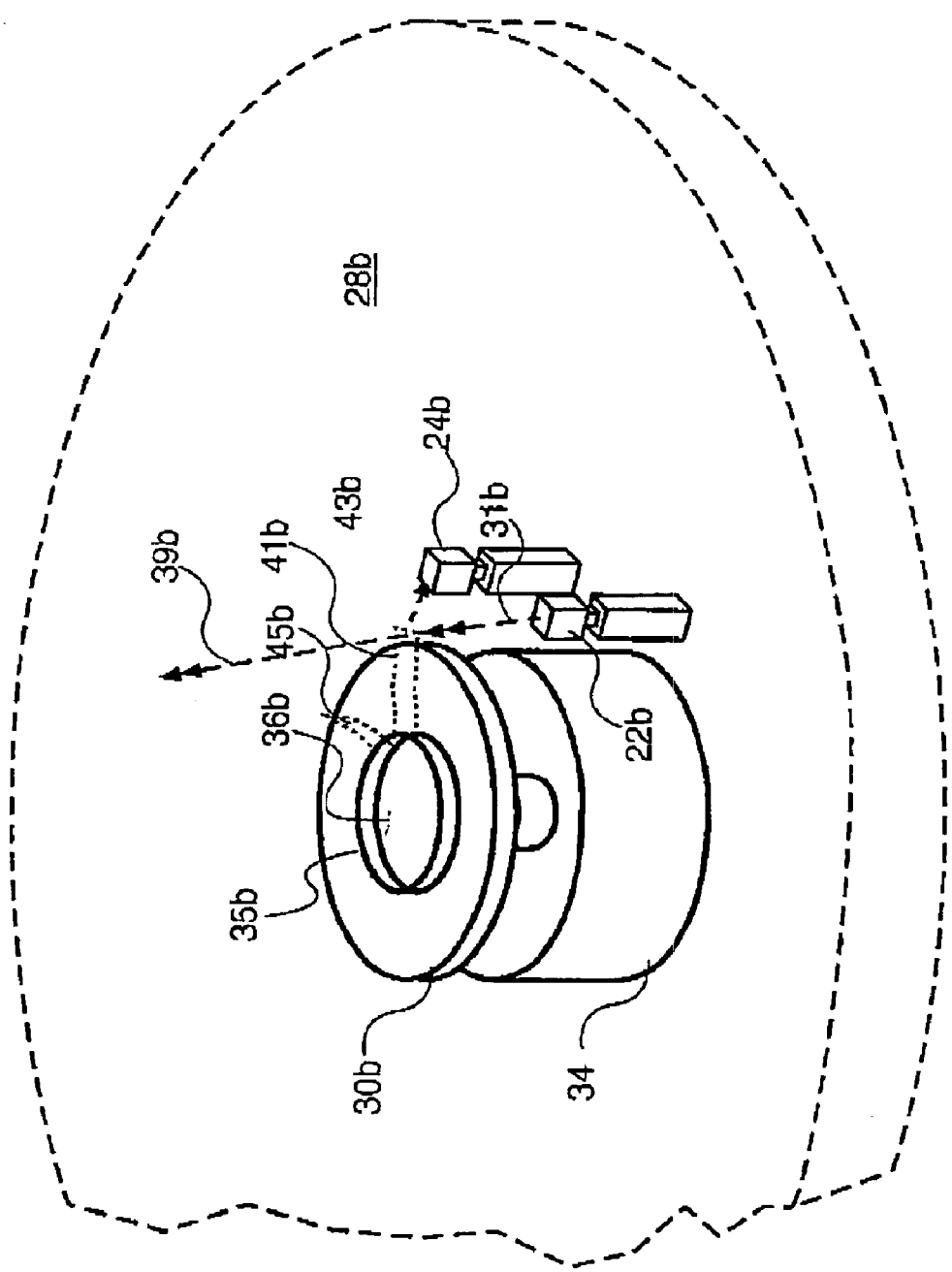
FIG. 3F is a perspective view of part of the CD drive shown in FIGS. 2A and 3B, with the positions of the disc and crack shown in dotted lines.

FIGS. 3A, 3B and 3F show a third embodiment of the present invention in which the transmitter 22b is positioned below the optical disc, and the light signal 31b (see FIG. 3F) is directed upwards at an angle towards the inner edge 35b of the disc. When no crack is present, the light path 31b traverses the plane of the disc, and the light exits the disc along path 39b without being detected by the receiver 24b. When a crack is present in the disc at the prescribed distance d2 (see FIG. 3A) from the inner edge 35b and rotates to the prescribed position 41b during the course of rotation, the light will be reflected back along path 43b and detected by the receiver 24b. Thus, the signal detected by the receiver is a constant low signal in the absence of a crack near the inner edge as shown in FIG. 3C. When a crack is present, as shown in FIG. 3F, the signal is reflected to the opposite side of the normal line to the crack along path 43b.

Examples of the signals received by receiver 24b are shown in FIGS. 3C–3C. In this embodiment, the receiver will receive a constant "low" signal as the disc spins in the absence of a crack, as shown in FIG. 3C. If one crack is present, the transmitted light will be reflected onto the receiver, resulting in one peak in the signal per revolution, as shown in FIG. 3D. If two cracks 41b and 45b are present, two peaks per revolution in the signal results, as shown in FIG. 3E.

Figure 4:
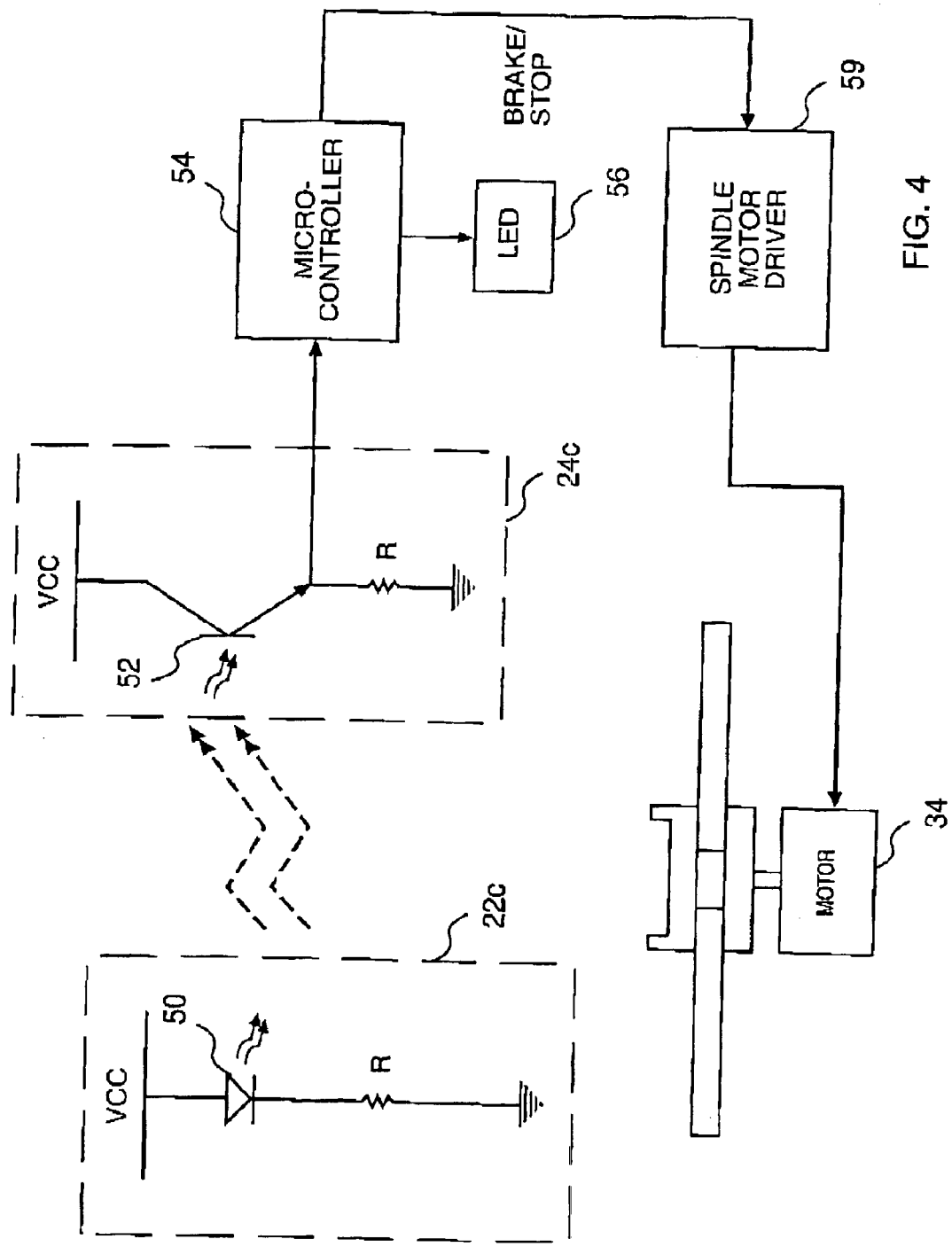
FIG. 4 is a schematic diagram to show the circuitry to control the crack detection and CD handling processes.

FIG. 4 shows one example of a simple electrical circuit for practising the present invention. In this example, a light emitting diode 50 is provided in the transmitter 22c. The receiver 24c contains a light sensor 52 that is coupled to a micro-controller 54. The micro-controller 54 is in turn coupled to a second light emitting diode (LED) 56 and the spindle motor drives 59 that drives spindle motor 34 of the CD drive. Thus, the loading of a normal disc without cracks gives a constant high or low signal to the receiver, depending its position, as discussed in the embodiments shown in FIGS. 1A–E, 2A–E and 3A–E. When the signal is interrupted due to the presence of one or more cracks, the micro-controller sends a command to LED (light emitting diode) 56 to start blinking to warn the user of the presence of cracks in the disc, and to apply a brake to the spindle motor, either to stop it or slow it down.

Figure 5A:
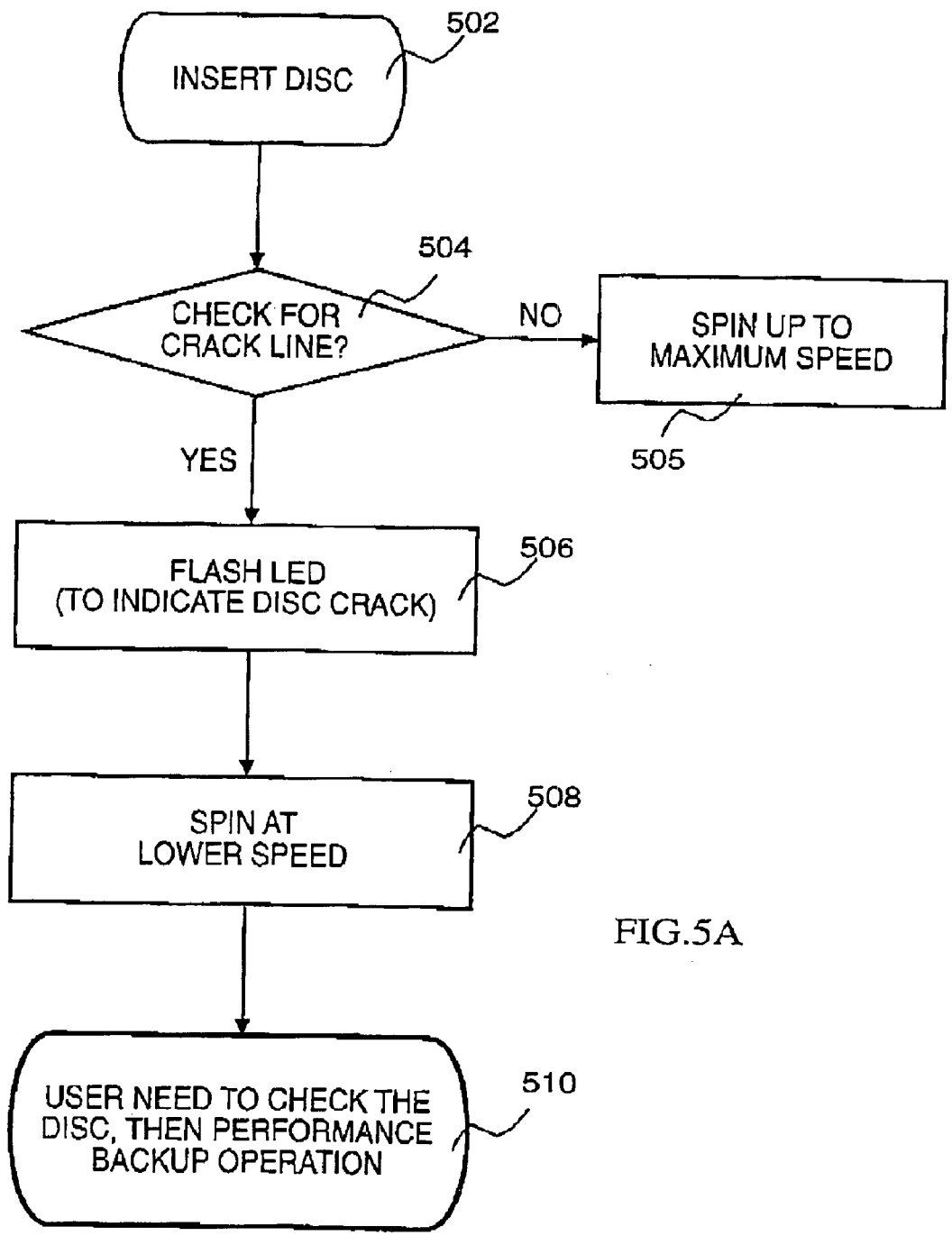
FIG. 5A is flowchart to illustrate the method of crack detection and CD handling according to the preferred embodiment of the present invention.

FIG. 5A shows a flowchart illustrating a process microcontroller in a CD drive for detecting disc cracks and preventing further deterioration. In step 502, the optical disc is inserted into the disc drive. The crack-checking routine 504, as described above, will be performed to check for cracks. If no crack is detected, the drive will perform normal optical drive functions such as commencement of normal reading and writing operations (step 505) If a crack line is detected, the light emitting diode (LED) will flash (step 506), and/or the speed of the motor will be lowered (step 508). An alert is also sent to the computer to ask for further instructions from the user 510. The users manual will also explain the meaning of the flashing diode as shown in step 506. Then the user has to decide whether to perform a backup operation as a damage is detected in the disc. It is clear that the speed of the initial monitoring phases (step 504) and subsequent reading phase (either 505 or 508) may be determined by the manufacturer.

Figure 5B:
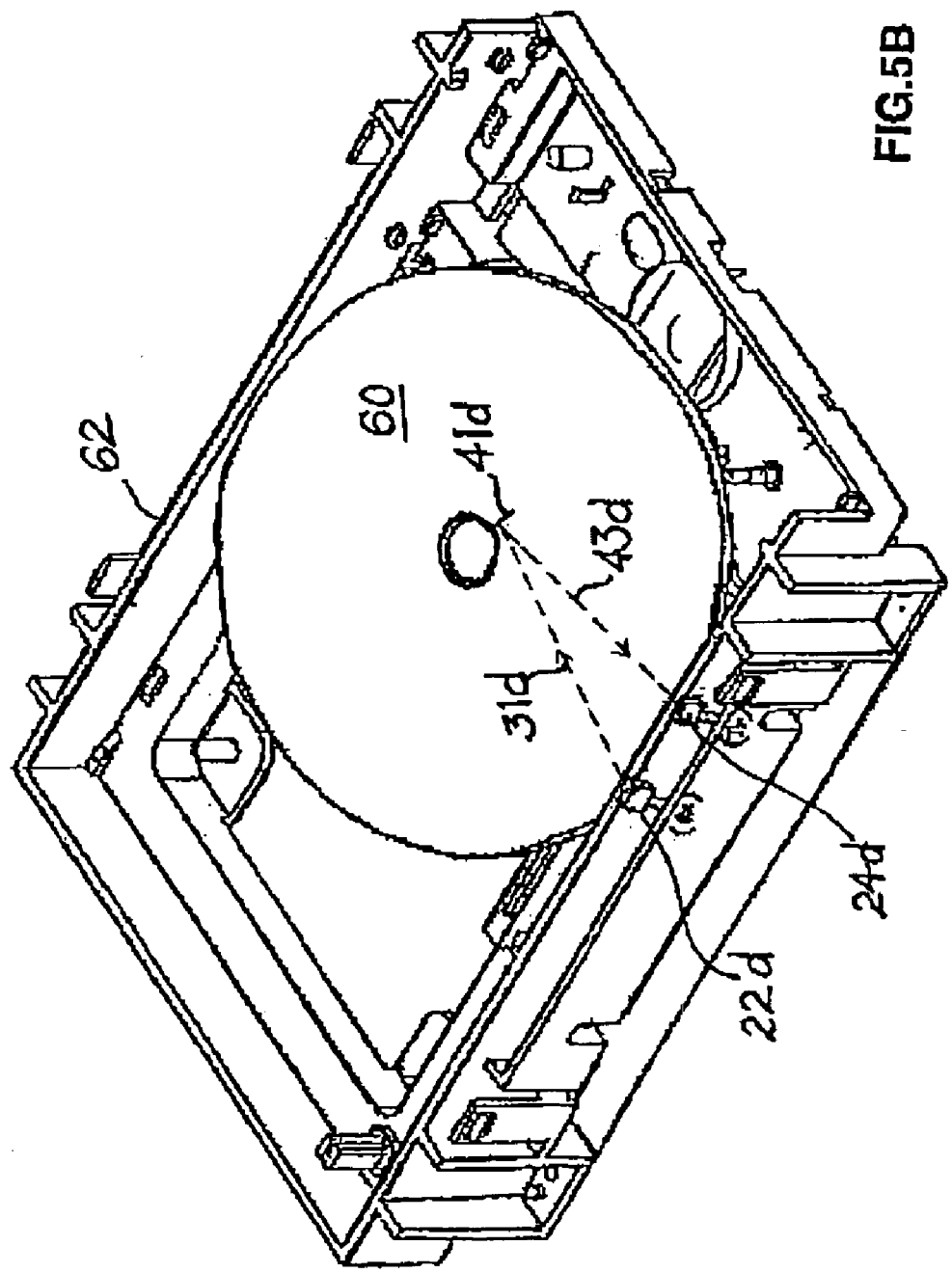
FIG. 5B shows part of a CD drive with a disc loaded therein and a crack detection system according to one embodiment of the present invention.

FIG. 5B shows the parts of a CD drive containing a crack detection system according to the present invention. In this figure, some of the details of the CD drive, such as the loader gears are not shown so as not to obscure the illustration of the present crack detection system. It is understood by one skilled in the art that CD drives contains loader and traverse mechanisms with the appropriate gears to function. In the embodiment shown in FIG. 5B, an optical disc 60 is loaded into the chassis 62 of a CD drive. Transmitter 22d and receiver 24d are mounted on the same side of the chassis a short distance apart. Transmitter 22d generates a light signal 31d that is propagated within the disc similar to path 31 in FIG. 1A. Receiver 24d is positioned to receive reflected signal when a crack is present in position 41d. A microcontroller (not shown) is used to analyse the signals received and notify the user according to the method described in FIGS. 1C–1E and 5A.

While the present invention has been described particularly with references to FIGS. 1A to 5B with emphasis on a CD drive, it should be understood that the figures are for illustration only and should not be taken as limitation on the invention. In addition, it is clear that the method and apparatus of the present invention has utility in many applications where crack detection is required. It is contemplated that many changes and modifications may be made by one or ordinary skill in the art without departing from the spirit and the scope of the invention described. For example, there are many other positions that the transmitter and the receiver may be placed to practice the present invention. The sensor in the receiver and the light emitting diode of the transmitter may also be positioned a distance from the spinning disc, and the light signals transmitted to the disc (and from the disc to the receiver) through optical fibers. Other types of disc drives can also be installed with the present features, examples include, but are not limited to, CD-ROM, CDRW, CDR, DVD-ROM, and rewritable DVD drives. Furthermore, the present invention may be practised as a stand-alone crack monitoring device for optical discs, in which case the disc drive can be a simple motor for spinning the disc, with a receiver and transmitter strategically placed to check for cracks. A microcontroller can then alert the user if cracks are detected.

What is claimed is:

1. A system for detecting cracks in optical discs, said disc having an outer edge and an inner edge, said system comprising:
   a disc drive for spinning said optical disc at a plurality of speeds including a normal operating speed and a lower speed;
   at least one transmitter for propagating a light signal through said optical disc,
   at least one receiver for receiving said light signal emerging from said disc; and
   a microcontroller coupled to said receiver for analyzing the received light signals;
   wherein the disc drive is maintained at the lower speed during crack detecting, and at the normal operating speed if no crack is detected.

2. A system according to claim 1 wherein said receive is adapted to receive unreflected propagated signals emerging from said disc.

3. A system according to claim 1 wherein said receiver is adapted to receive propagated signals reflected by at least one crack in said disc.

4. A system according to claim 1 wherein if one or more cracks is detected, the disc drive is maintained at the lower speed or halted.

5. A system according to claim 1 wherein if one or more cracks is detected, a brake is applied to a spindle of a motor of the disc drive.

6. A system according to claim 5 wherein the brake is applied to halt the spindle.

7. A system according to claim 6 wherein the brake is applied to slow down the spindle.

8. An optical disc drive comprising a traverse mechanism for spinning said disc and retrieving information from said disc, a loader mechanism for loading said disc onto said traverse mechanism, and a crack detection mechanism, said crack detection mechanism comprising:
   a transmitter, mounted on said disc drive, for propagating a light signal through the interior of said spinning optical disc;
   a receiver mounted on said disc drive and having a light sensor positioned to receive light signals emerging from said disc; and
   a microcontroller, coupled to said receiver, for analysing received light signals, and for sending a command to the disc drive based on the received light signals, the command being selected from the group consisting of: operate at a normal speed, maintain a lower speed, slow the disc drive, and halt the disc drive.

9. An optical disc drive according to claim 8 wherein said receiver is adapted to receive reflected propagated light emerging from said disc, said reflected propagated light generated by a crack positioned along the path of said propagated light.

10. An optical disc drive according to claim 8 wherein said receiver is adapted to receive unreflected propagated light emerging from said disc.

11. An optical disc drive according to claim 8, wherein the disc drive is maintained at the lower speed during crack detection, and operated at the normal speed if no crack is detected.

12. An optical disc drive according to claim 11 wherein if one or more cracks is detected, the disc drive is maintained at the lower speed or halted.

13. An optical disc drive according to claim 11, wherein if one or more cracks is detected, a brake is applied to a spindle of a motor of the disc drive.

14. An optical disc drive according to claim 13 wherein the brake is applied to halt the spindle.

15. A method for detecting cracks in optical discs comprising:
   rotating said optical disc;
   propagating an optical signal through the interior of said rotating optical disc, wherein said optical signal is propagated along the plane of said disc;
   receiving said propagated signal; and
   analysing the pattern of the received signal to determine if a crack is present in said optical disc; and
   sending a command to the disc drive based on the received light signals, the command being selected from the group consisting of: operate at a normal speed, maintain a lower speed, slow the disc drive, and halt the disc drive.

16. A method according to claim 15 wherein said optical signal is further propagated along a path that is approximately tangential to the inner edge of said disc.

17. A method according to claim 15 wherein the disc drive is maintained at the lower speed during crack detecting, and operated at the normal speed if no crack is detected.

18. A method according to claim 15 wherein if one or more cracks is detected, the disc drive is maintained at the lower speed or halted.

19. A method according to claim 15 wherein if one or more cracks is detected, a brake is applied to a spindle of a motor of the disc drive.

20. A method according to claim 19 wherein the brake is applied to halt the spindle.

21. A method for detecting cracks in optical discs comprising:
    loading said optical disc into a disc drive;
    rotating said disc drive at a low speed;
    propagating an optical signal through said optical disc;
    receiving said propagated signal from said optical disc;
    analysing said received signal to determine if a crack is present on said optical disc; and
    sending the appropriate command to said disc drive,
    wherein when a crack is present, said command comprises:
    sending information to the user to indicate that a crack has been detected; and
    requesting said user to selected between a first and a second option, said first option comprising maintaining said optical disc rotating at a slow speed, and retrieving information from said optical disc, said second option comprising stopping said rotation.

22. A method according to claim 21 wherein said crack radiates from the inner edge of said disc; said optical signal is further propagated along a path that is approximately tangential to the inner edge of said disc, the closest distance between said path and said inner edge being the length of the shortest crack to be detected.

23. A method according to claim 21 wherein said light signal is propagated along a path that traverses the plane of said optical disc, said path traversing said disc at a position proximate said inner edge.

24. A method according to claim 21 wherein if no crack is present in said optical disc, said command comprises operating at a normal speed.

25. A system for detecting cracks in optical discs, said disc having an outer edge and an inner edge, said system comprising:
    a disc drive for spinning said optical disc;
    at least one transmitter positioned below said optical disc for propagating a light signal directed towards the inner edge of said optical disc,
    at least one receiver configured for receiving propagated light signal reflected by at least one crack in said disc; and
    a microcontroller coupled to said receiver for analysing the propagated light signals received by the receiver and configured to send a command to the disc drive based on the received propagated light signals, wherein the system is configured to detect the presence of a crack by an increase in propagated light signals received by the at least one receiver.

26. A system according to claim 25 wherein said receiver is located below said disc.

27. A system according to claim 25 wherein said microcontroller further sends a command to the disc drive based on the received light signals, the command being selected from the group consisting of: operate at a normal speed, maintain a lower speed, slow the disc drive, and halt the disc drive.

28. A system according to claim 27 wherein the disc drive is maintained at the lower speed during crack detecting, and operated at the normal speed if no crack is detected.

29. A system according to claim 27 wherein if one or more cracks is detected, the disc drive is maintained at the lower speed or halted.

30. A system according to claim 27 wherein if one or more cracks is detected, a brake is applied to a spindle of a motor of the disc drive.

31. A system according to claim 30 wherein the brake is applied to halt the spindle.

32. An optical disc drive comprising a traverse mechanism for spinning said disc and retrieving information from said disc, a loader mechanism for loading said disc onto said traverse mechanism, and a crack detection mechanism, said crack detection mechanism comprising:
    a transmitter positioned below said optical disc for propagating a light signal through the interior of said spinning optical disc;
    a receiver mounted on said disc drive and having a light sensor positioned to receive said light signal emerging from said disc, wherein said receiver is adapted to receive propagated signals reflected by at least one crack in said disc; and
    a microcontroller, coupled to said receiver for analysing received light signals and configured to send a command to the disk drive based on the received light signals.

33. An optical disc drive according to claim 32 wherein said microcontroller further sends a command to the disc drive based on the received light signals, the command being selected from the group consisting of: operate at a normal speed, maintain a lower speed, slow the disc drive, and halt the disc drive.

34. An optical disc drive according to claim 33 wherein the disc, drive is maintained at the lower speed during crack detection, and operated at the normal speed if no crack is detected.

35. An optical disc drive according to claim 34 wherein if one or more cracks is detected, the disc drive is maintained at the lower speed or halted.

36. An optical disc drive according to claim 34 wherein if one or more cracks is detected, a brake is applied to spindle of a motor of the disc drive.

37. An optical disc drive according to claim 36 wherein the brake is applied to halt the spindle.

38. An optical disc drive system comprising:
    an optical disc drive configured for performing an inspection operation and at least one of a read and write operation on a spinning optical disc;
    a transmitter configured for performing the inspection operation by propagating a light signal through the interior of said spinning optical disc to emerge from said disc; and
    a receiver positioned to receive the propagated light signal emerging from said disc and to detect the presence of a crack in said disc during the inspection operation by a change in the propagated light signal emerging from said disc.

39. The optical disc drive system as recited in claim 38 wherein the transmitter is positioned outside of the periphery of the disk and in the plane of the disk such that the light signal is propagated from a point on the outer edge of the disc and along the plane of the disc.

40. The optical disc drive system as recited in claim 38 wherein the receiver is configured to receive reflected propagated light signals emerging from said disc.

41. The optical disc drive system as recited in claim 38 wherein the receiver is configured to receive unreflected propagated light signals emerging from the disc.

42. The optical disc drive system as recited in claim 38 wherein the receiver is configured to receive unreflected propagated light signals emerging from said disc and wherein the presence of a crack is determined by a decrease in the quantity of unreflected propagated light signals emerging from said disc.

43. The optical disc drive system as recited in claim 38 further comprising a microcontroller coupled to said receiver for analyzing signals received thereof.

* * * * *